(12) United States Patent
Choi (10) Patent No.: US 10,077,803 B2
(45) Date of Patent: Sep. 18, 2018

(54) BALL-SOCKET TYPE TILTING PAD JOURNAL BEARING

(71) Applicant: Doosan Heavy Industries & Construction Co., Ltd., Gyeongsangnam-do (KR)

(72) Inventor: Tae Gyu Choi, Gyeonggi-do (KR)

(73) Assignee: Doosan Heavy Industries & Construction Co., Ltd., Changwon-si, Gyeongsangnam-do (KR)

( * ) Notice: Subject to any disclaimer, the term of this patent is extended or adjusted under 35 U.S.C. 154(b) by 0 days.

(21) Appl. No.: 15/418,127

(22) Filed: Jan. 27, 2017

(65) Prior Publication Data

US 2018/0003219 A1    Jan. 4, 2018

(30) Foreign Application Priority Data

Jun. 30, 2016   (KR) .................. 10-2016-0082700

(51) Int. Cl.
*F16C 17/03*   (2006.01)
*F16C 33/10*   (2006.01)
*F16C 37/00*   (2006.01)

(52) U.S. Cl.
CPC ............ *F16C 17/03* (2013.01); *F16C 33/103* (2013.01); *F16C 33/1045* (2013.01); *F16C 33/1065* (2013.01); *F16C 33/1085* (2013.01); *F16C 37/002* (2013.01)

(58) Field of Classification Search
CPC .... F16C 17/03; F16C 33/103; F16C 13/1045; F16C 33/1065; F16C 33/1085; F16C 37/002

USPC ................. 384/117, 306–309, 311–313, 316
See application file for complete search history.

(56) References Cited

U.S. PATENT DOCUMENTS

| | | | | |
|---|---|---|---|---|
| 2,348,928 A | * | 5/1944 | Sampatacos | F16C 17/03 29/898.054 |
| 3,022,123 A | | 2/1962 | Gruber | |
| 3,610,711 A | * | 10/1971 | Mierley, Sr. | F16C 17/03 277/422 |
| 3,918,770 A | * | 11/1975 | Rouch | F16C 13/04 384/205 |
| 3,994,541 A | * | 11/1976 | Geary | F01D 25/164 384/117 |

(Continued)

FOREIGN PATENT DOCUMENTS

| | | |
|---|---|---|
| JP | 11-182535 A | 7/1999 |
| KR | 10-0474383 B1 | 3/2005 |

OTHER PUBLICATIONS

European Search Report dated Jun. 1, 2017 in European Application No. 17164671.4.

(Continued)

*Primary Examiner* — Marcus Charles
(74) *Attorney, Agent, or Firm* — Saliwanchik, Lloyd & Eisenschenk (57) ABSTRACT

A ball-socket type tilting pad journal bearing configured to reduce friction between a tilting pad and a pivot includes a housing body, a plurality of tilting pads disposed inside the housing body, and a plurality of pivots fixed on an inner surface of the housing body. An oil collection unit for collecting oil is provided in at least one of an outer circumferential surface of each of the pivots and a socket of each of the tilting pads.

20 Claims, 7 Drawing Sheets

(56) References Cited

U.S. PATENT DOCUMENTS

| | | | | |
|---|---|---|---|---|
| 4,039,228 | A * | 8/1977 | Repose | F16C 17/03 |
| | | | | 384/312 |
| 5,518,321 | A * | 5/1996 | Hata | F16C 33/108 |
| | | | | 384/311 |
| 5,547,287 | A * | 8/1996 | Zeidan | F16C 17/035 |
| | | | | 384/114 |
| 6,485,182 | B2 * | 11/2002 | Nicholas | F16C 17/03 |
| | | | | 384/117 |
| 6,499,883 | B2 * | 12/2002 | Miller | F16C 17/03 |
| | | | | 384/117 |
| 6,767,133 | B2 * | 7/2004 | New | F16C 17/03 |
| | | | | 384/309 |
| 9,169,866 | B2 * | 10/2015 | Sato | F16C 37/002 |
| 9,377,051 | B2 * | 6/2016 | Hemmi | F16C 17/107 |
| 2006/0193543 | A1 | 8/2006 | Geiger | |
| 2008/0013872 | A1 | 1/2008 | Geiger | |
| 2009/0008892 | A1 | 1/2009 | Gaumer | |
| 2013/0336605 | A1 | 12/2013 | Buguin et al. | |
| 2014/0270607 | A1 * | 9/2014 | Livermore-Hardy | |
| | | | | F16C 37/002 |
| | | | | 384/117 |
| 2015/0159692 | A1 * | 6/2015 | Dourlens | F16C 17/03 |
| | | | | 384/192 |
| 2016/0169275 | A1 * | 6/2016 | Sato | F16C 33/108 |
| | | | | 384/117 |

OTHER PUBLICATIONS

International Search Report in International Application No. PCT/KR2017/000841, filed Jan. 24, 2017.

\* cited by examiner

BALL-SOCKET TYPE TILTING PAD JOURNAL BEARING

CROSS-REFERENCE TO RELATED APPLICATION

This application claims priority under 35 U.S.C. § 119 to Korean Patent Application No. 10-2016-0082700, filed Jun. 30, 2016, which is herein incorporated by reference in its entirety.

BACKGROUND OF THE INVENTION

Field of the Invention

Exemplary embodiments of the present invention relate to a ball-socket type tilting pad journal bearing, and more particularly, to a tilting pad journal bearing configured to reduce friction between a tilting pad and a pivot.

Description of the Related Art

Recent global research trends in super precision, an increase in speed, and a reduction in weight aim to develop a rotator system having superior reliability and high efficiency. Recently, the rotating speeds of industrial machines are gradually increased. Due to an increase in rotating speed, driving efficiency per unit volume or unit weight of rotating machines can be enhanced.

However, as the rotating speeds of the rotating machines are increased compared to before, a significant amount of vibrations are generated during an operation, thus causing problems of noise, damage to parts, and the like. Particularly, in large rotating machines such as a turbine or a generator, a heavy rotating shaft must be stably supported. For this, a bearing device is used.

In this regard, the bearing functions to fix the position of the rotating shaft and support the weight of the rotating shaft and a load applied to the rotating shaft, thus making it possible for the rotating shaft to smoothly rotate. However, a general bearing such as a rolling bearing or a sliding bearing has not only a comparatively low support stiffness but also comparatively low vibration damping performance. As a result, if a general bearing is provided for a rotating shaft of a rotating machine that rotates at high speed, there is a problem of low stability. Due to this, a tilting pad bearing is typically applied to a rotating shaft that rotates at high speed.

In particular, a tilting pad bearing that is a kind of lubrication bearing has excellent stability under conditions of high speed and is able to easily adapt to a load direction using pivots, thus exhibiting excellent bearing characteristics. Therefore, tilting pad bearings are mainly used for a high-speed/high-pressure rotating machine.

The tilting pad bearing is configured such that a plurality of tiltable bearing pads (tilting pads) are disposed around a rotating shaft in a bearing housing. Each tilting pad is tiltably supported by a pivot installed in the bearing housing. Such a bearing having tilting pads supports the rotating shaft on the tilting pads and compensates for eccentricity and tilt of the rotating shaft, thus making it possible for the rotating shaft to more reliably rotate. When the rotating shaft rotates, lubricant is guided into space between the outer circumferential surface of the rotating shaft and bearing surfaces of the tilting pads, so that a wedge-shaped oil film is formed therebetween such that the rotating shaft is reliably supported.

In the tilting pad bearing, types of supporting a pad may be classified into three types. Of them, a ball-socket type can secure structural stability under conditions of a normal load because the sizes of a ball and a socket can be appropriately selected such that the level of a pivot stress is reduced.

However, when the tilting pads are inclined at predetermined angles depending on the direction of an axial load of the rotating shaft that is rotating at high speed, friction between the tilting pads and the pivots supporting the tilting pads is caused.

Consequently, there is a problem in that lower portions of the tilting pads and the pivots are easily worn and damaged due to friction therebetween.

BRIEF SUMMARY

The present invention provides a tilting pad journal bearing configured to reduce friction between a tilting pad and a pivot.

Other advantages of the present invention can be understood by the following description, and become apparent with reference to the embodiments of the present invention.

In accordance with one aspect of the present invention, a ball-socket type tilting pad journal bearing comprises: a cylindrical housing body; a plurality of tilting pads disposed inside the housing body and arranged along a circumference of the housing body, with a concave socket formed in a side surface of each of the tilting pads that faces an inner surface of the housing body; and a plurality of pivots fixed on the inner surface of the housing body and inserted into the respective sockets of the tilting pads, each of the pivots having a curved surface, wherein an oil collection unit for collecting oil is provided in an outer circumferential surface of each of the pivots.

In accordance with another aspect of the present invention, a ball-socket type tilting pad journal bearing comprises: a cylindrical housing body; a plurality of tilting pads disposed inside the housing body and arranged along a circumference of the housing body, with a concave socket formed in a side surface of each of the tilting pads that faces an inner surface of the housing body; and a plurality of pivots fixed on the inner surface of the housing body and inserted into the respective sockets of the tilting pads, each of the pivots having a curved surface, wherein an oil collection unit for collecting oil is provided in the socket of each of the tilting pads.

In accordance with yet another aspect of the present invention, a ball-socket type tilting pad journal bearing comprises: a cylindrical housing body; a plurality of tilting pads disposed inside the housing body and arranged along a circumference of the housing body, with a concave socket formed in a side surface of each of the tilting pads that faces an inner surface of the housing body; and a plurality of pivots fixed on the inner surface of the housing body and inserted into the respective sockets of the tilting pads, each of the pivots having a curved surface, wherein an oil collection unit for collecting oil is provided in both an outer circumferential surface of each of the pivots and the socket of each of the tilting pads.

The ball-socket type tilting pad journal bearing may further include a fixed housing coupled to a predetermined portion of the housing body, wherein support pins protruding from upper and lower surfaces of each of the tilting pads in an axial direction of the tilting pad may be respectively inserted into and fixed on a depression formed in the housing body and a depression formed in the fixed housing.

The oil collection unit may include a plurality of circular grooves formed in a circumferential direction and spaced apart from each other.

The grooves spaced apart from each other may be formed parallel with each other in a direction perpendicular to a center axis of the pivot.

The oil collection unit may include a spiral groove formed in a circumferential direction.

The oil collection unit may include a plurality of point-shaped dimples.

The oil collection unit may include a plurality of ring-shaped dimples.

The groove or the dimple may not be formed on a peak point of the pivot.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Hereinafter, various embodiments of a ball-socket type tilting pad journal bearing according to the present invention will be described with reference to the attached FIG. 1 to 7.

Terms or words used hereinafter should not be construed as having common or dictionary meanings, but should be construed as having meanings and concepts that comply with the technical spirit of the present invention on the basis of the principle that the inventor may appropriately define the concepts of the terms in order to best describe his or her invention. Accordingly, the following description and drawings illustrate exemplary embodiments of the present invention and do not fully represent the scope of the present invention. It would be understood by one of ordinary skill in the art that a variety of equivalents and modifications of the embodiments exist.

Figure 1:
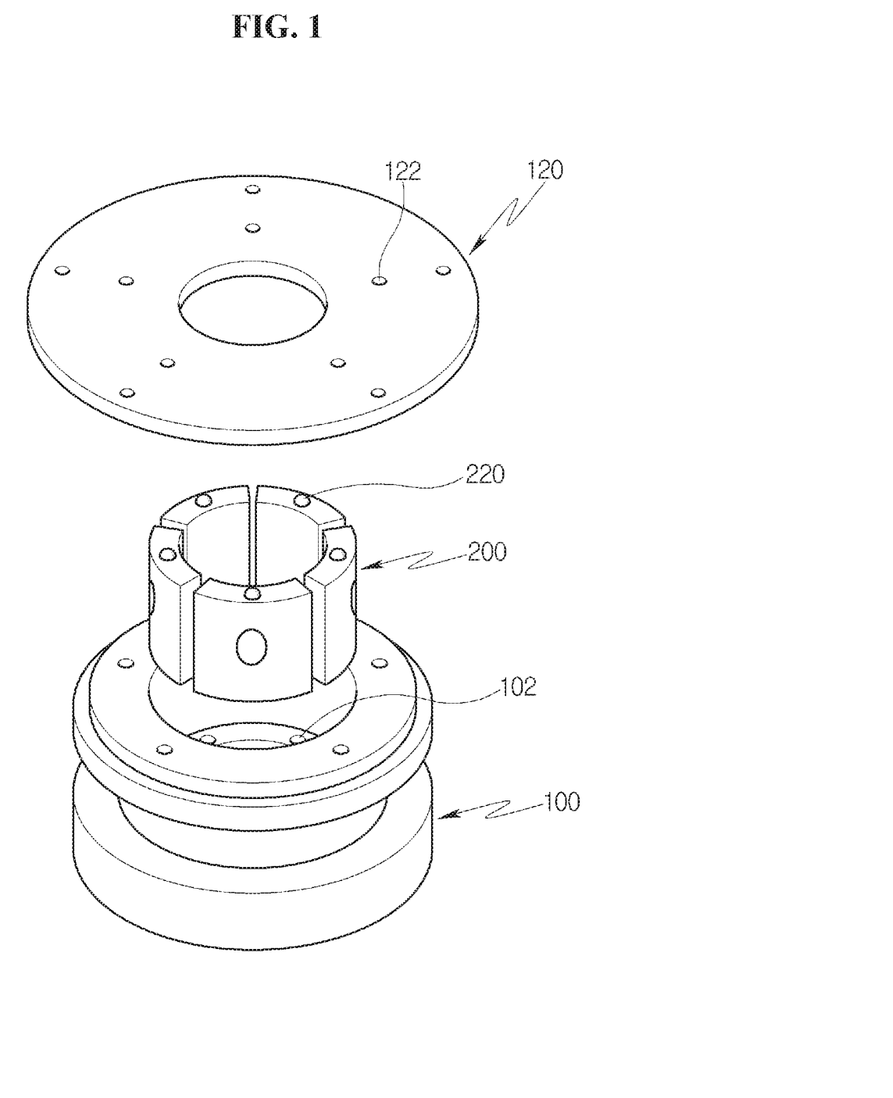
FIG. 1 is an exploded perspective view illustrating a ball-socket type tilting pad journal bearing according to a first embodiment of the present invention.
Figure 2:
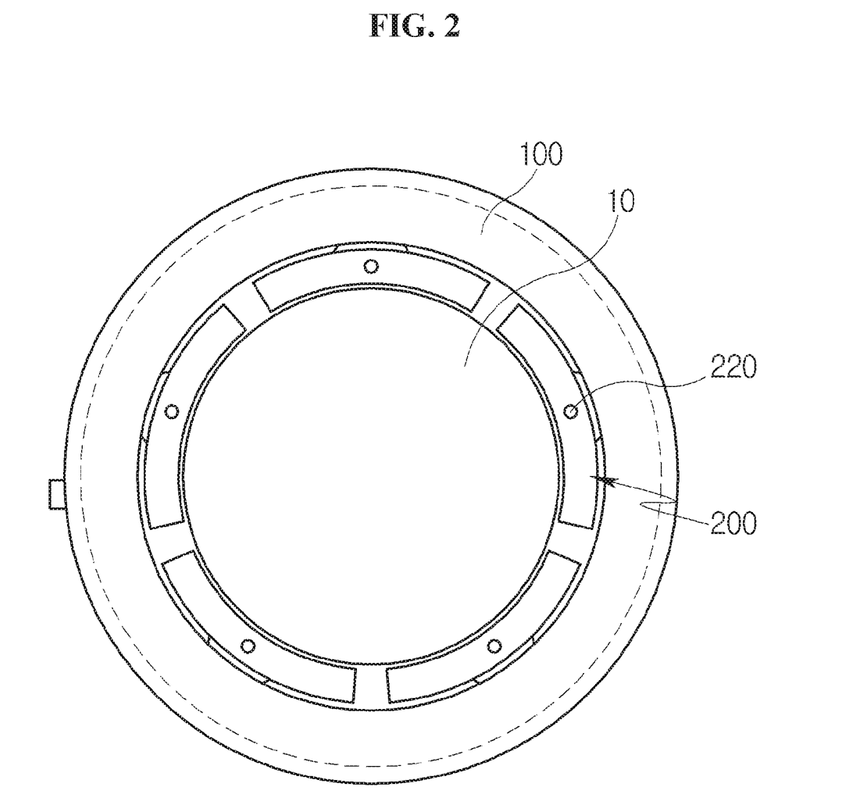
FIG. 2 is a top plan view showing the assembled tilting pad journal bearing of FIG. 1 from which a fixed housing has been removed.
Figure 3:
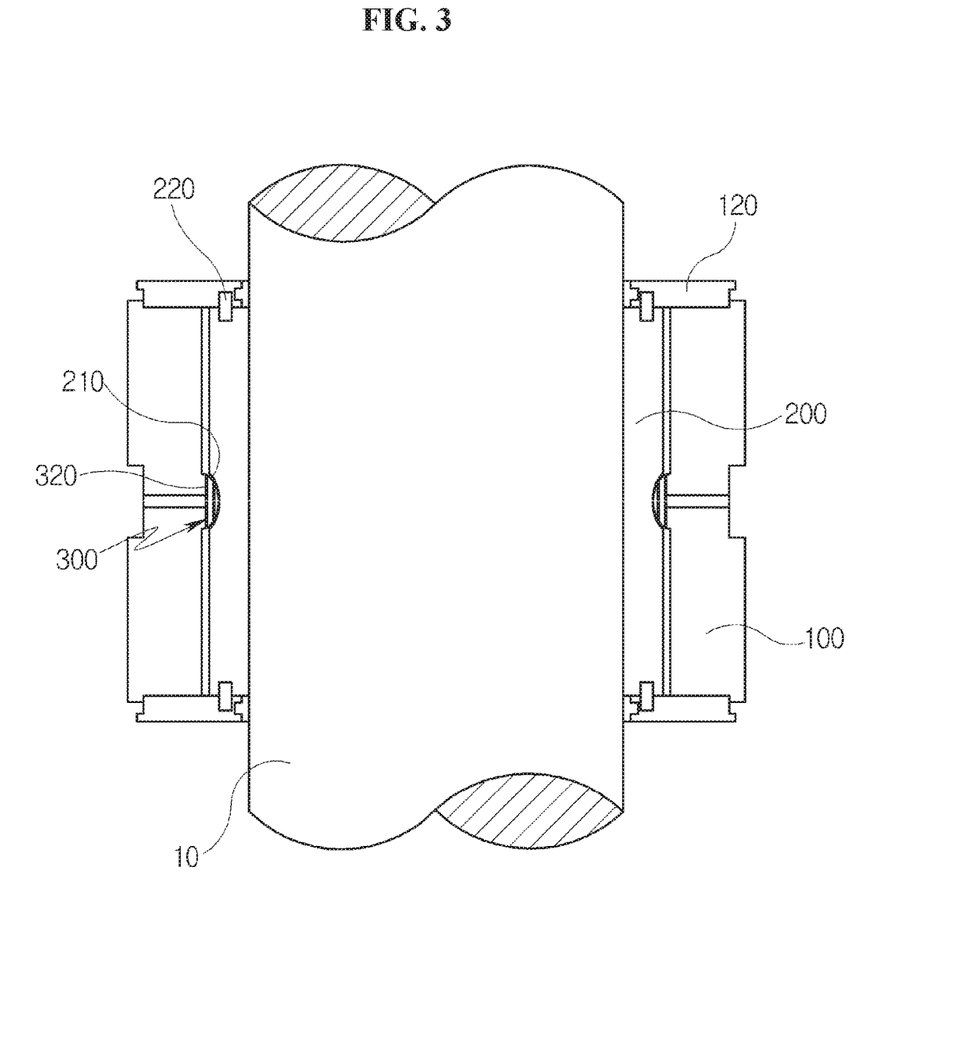
FIG. 3 is a side sectional view of FIG. 2.
Figure 4:
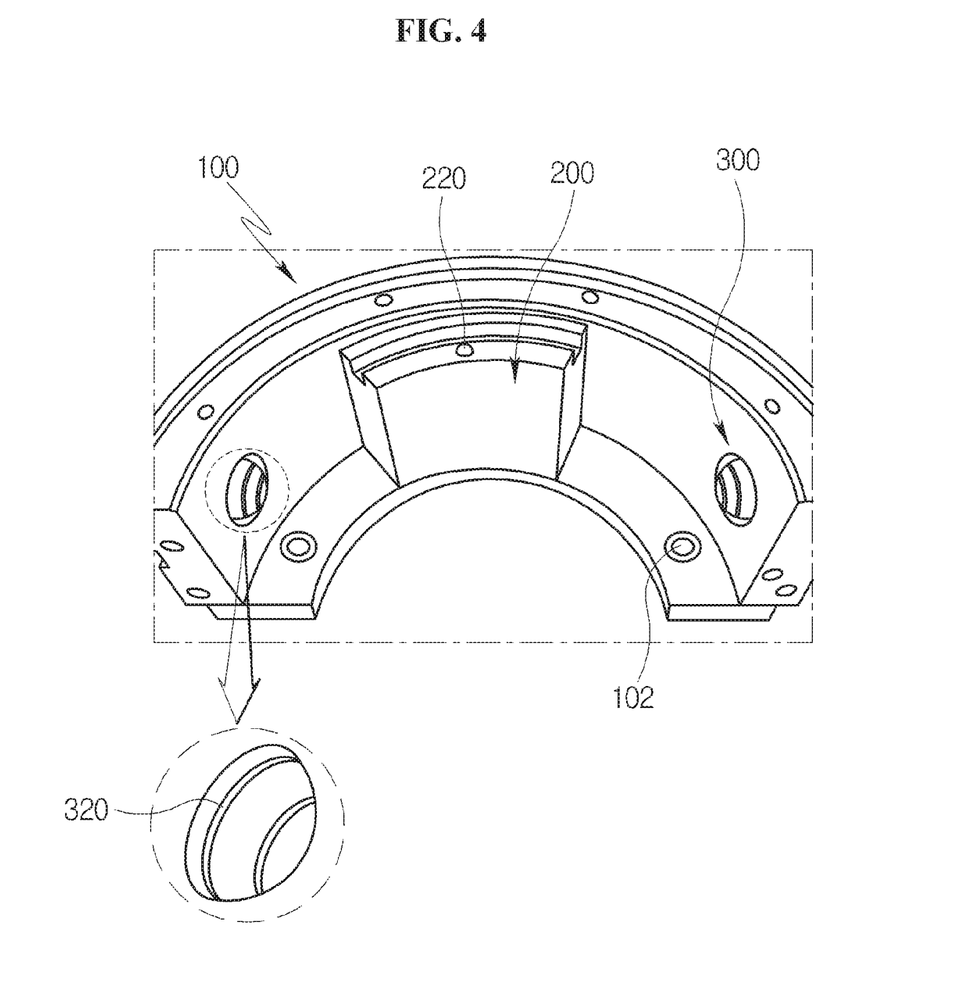
FIG. 4 is a perspective view illustrating a portion of FIG. 2.
Figure 5:
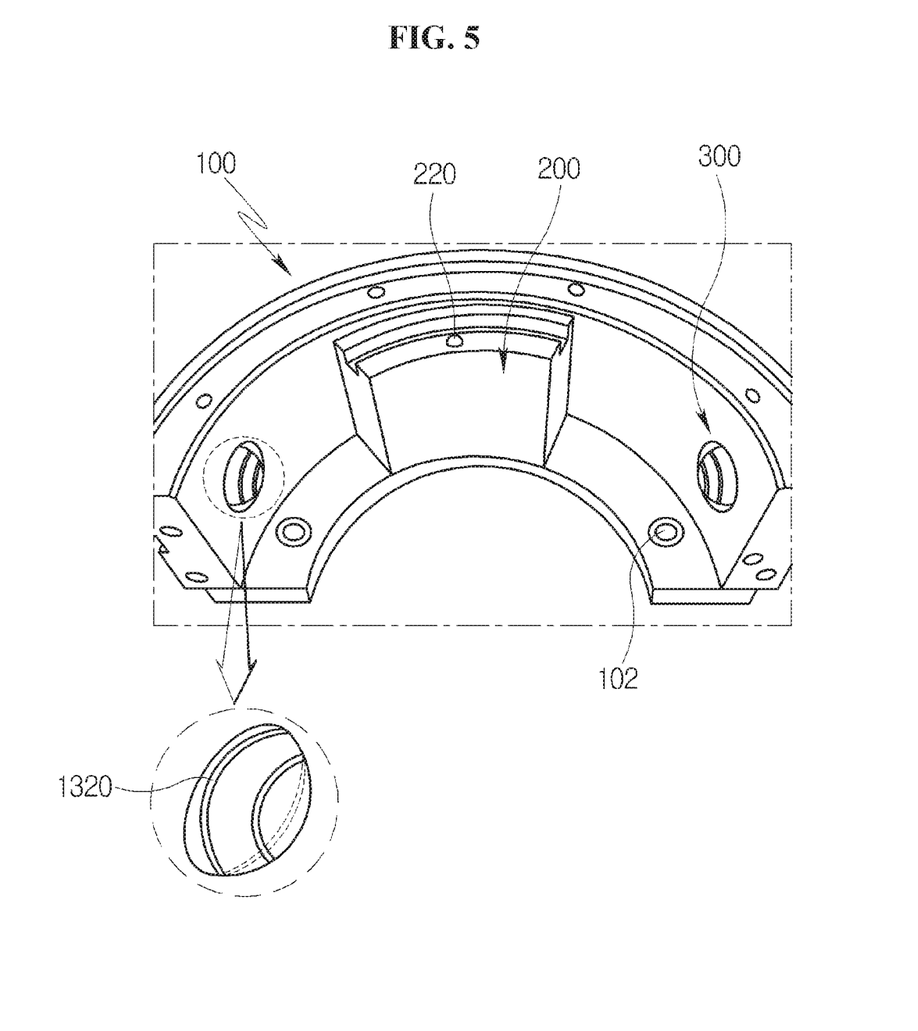
FIG. 5 is a perspective view illustrating a ball-socket type tilting pad journal bearing according to a second embodiment of the present invention.
Figure 6:
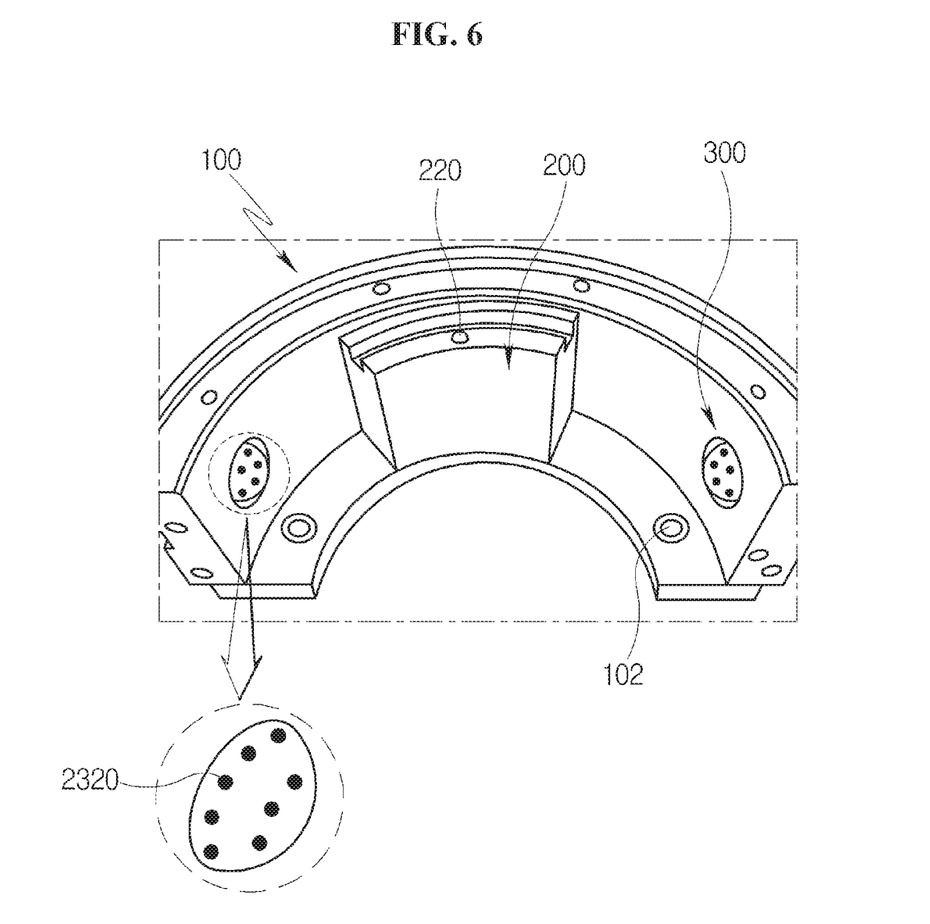
FIG. 6 is a perspective view illustrating a ball-socket type tilting pad journal bearing according to a third embodiment of the present invention.
Figure 7:
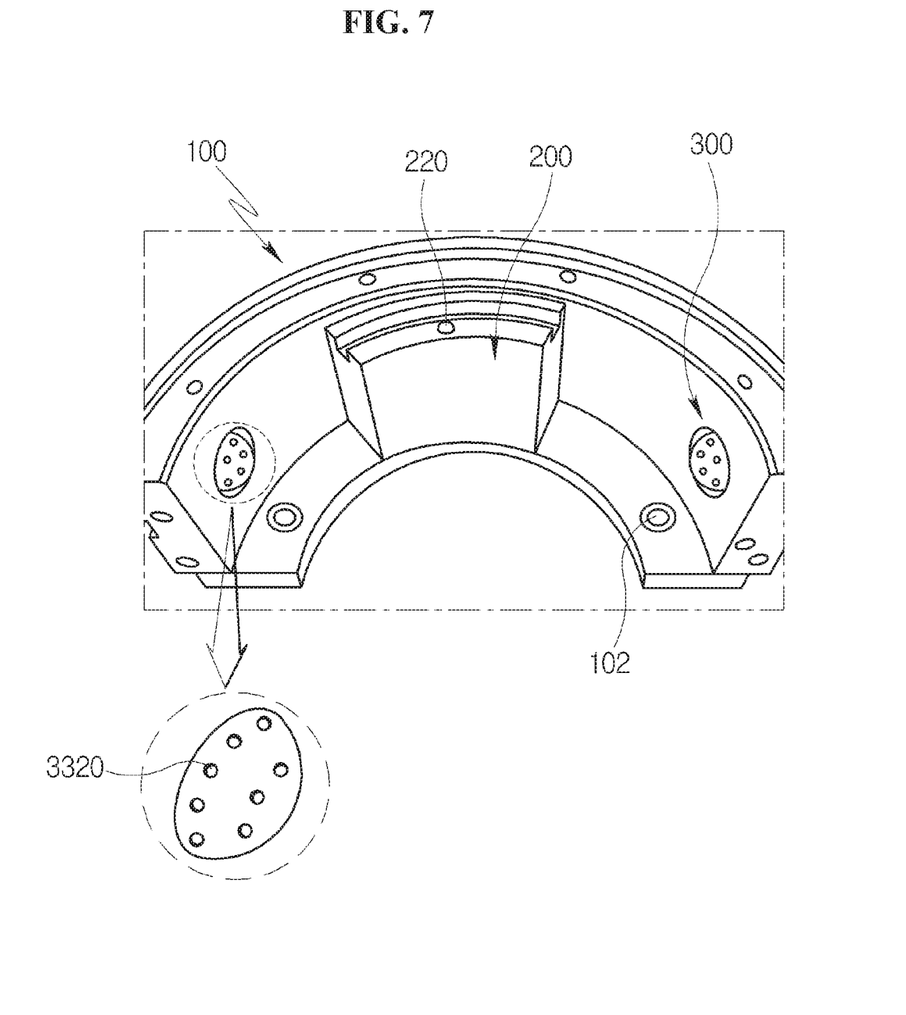
FIG. 7 is a perspective view illustrating a ball-socket type tilting pad journal bearing according to a fourth embodiment of the present invention.

FIG. 1 is an exploded perspective view illustrating a ball-socket type tilting pad journal bearing according to a first embodiment of the present invention. FIG. 2 is a top plan view showing the assembled tilting pad journal bearing of FIG. 1 from which a fixed housing has been removed. FIG. 3 is a side sectional view of FIG. 2. FIG. 4 is a perspective view illustrating a portion of FIG. 2. FIG. 5 is a perspective view illustrating a ball-socket type tilting pad journal bearing according to a second embodiment of the present invention. FIG. 6 is a perspective view illustrating a ball-socket type tilting pad journal bearing according to a third embodiment of the present invention. FIG. 7 is a perspective view illustrating a ball-socket type tilting pad journal bearing according to a fourth embodiment of the present invention.

First, the configuration of the ball-socket type tilting pad journal bearing according to the first embodiment of the present invention will be described with reference to FIGS. 1 to 4.

The configuration of the ball-socket type tilting pad journal bearing according to the first embodiment of the present invention schematically includes a housing body 100, tilting pads 200, and pivots 300.

Housing body 100 has a cylindrical shape with a predetermined height. A center shaft 10 is disposed in a central portion of the housing body 100 so as to be rotatable in the housing body 100. Any typical shaft can be applied as the center shaft 10 that is a rotor, so long as it is a rotating shaft for a rotating machine which is rotated at a high speed. A plurality of oil holes may be formed in a circumferential surface of the housing body 100 so that oil can flow into the housing body 100 through the oil holes.

A plurality of depressions 102, which are used for coupling of after-mentioned support pins of the tilting pads, may be formed in the housing body 100, in more detail, in an end of an annular ring that extends and protrudes into the housing body 100 so as to support the tilting pads.

A fixed housing 120 is coupled to a predetermined portion of the housing body 100. A frame, pillar, or the like separated from the present invention may be coupled to the fixed housing 120. A plurality of depressions 122 for coupling of after-mentioned support pins of the tilting pads, as well as bolt holes for bolt coupling, may be formed in the fixed housing 120.

A plurality of tilting pads 200 are disposed inside the housing body 100, preferably, at positions spaced apart from each other at regular intervals. In the first embodiment of the present invention, five titling pads 200 are disposed at positions spaced apart from each other at regular intervals. However, the present invention is not limited to this. According to another applicable embodiment, the plurality of tilting pads may include any number of tilting pads, for example, four or six tilting pads. The plurality of tilting pads 200 are disposed between the inner surface of the housing body 100 and the center shaft 10 such that each tilting pad 200 is spaced apart from the inner surface of the housing body 100 and the outer surface of the center shaft 10 by predetermined distances.

Furthermore, a concave socket 210 is formed in a side surface of each tilting pad 200 that faces the inner surface of the housing body 100. The socket 210 is preferably formed in a central portion of the tilting pad 200. In detail, the socket 210 may have a hemispherical shape with a predetermined curvature. Pivots 300, which will be explained later herein, are inserted into the respective sockets 210 so that the plurality of tilting pads 200 can be maintained to be spaced apart from the inner surface of the housing body 100 by a predetermined distance and can be appropriately tilted depending on a direction in which an axial load is applied to the center shaft 10 when the center shaft 10 is rotated. Thereby, the moment balance is automatically adjusted so that even when the rotor is rotated at a high speed, unstable vibrations can be reduced.

The cross-section of each of the tilting pads 200 has a sectorial pillar shape. A side surface of each tilting pad 200 that faces the center shaft 10 is formed of a curved surface corresponding to the curvature of the center shaft 10, and a side surface thereof that faces the inner surface of the housing body 100 is formed of a curved surface corresponding to the curvature of the inner surface of the housing body 100. Support pins 220 protrude from upper and lower surfaces of the tilting pads 200, each of which is formed in a sectorial shape based on the axial direction of the tilting pads 200. Each support pin 220 may have an approximately hemispherical or rectangular shape. A support pin 220 is preferably provided in a central portion of each of the upper and lower surfaces of the tilting pad 200, each of which has a sectorial shape. More preferably, the support pins 220 provided on the upper and lower surfaces of the tilting pad 200 are disposed at positions opposite to each other in a straight line to have a shape in which a support pin passes through the upper and lower surface of the tilting pad 200. The support pins 220 provided on the upper and lower surfaces of each tilting pad 200 are respectively inserted into and fixed in the corresponding depression 102 formed in the housing body 100 and the corresponding depression 122 formed in the fixed housing 120. In this way, the plurality of tilting pads 200 can be appropriately installed to be spaced apart from the inner surface of the housing body 100 and the center shaft 10 by respective predetermined distances. The tilting pads 200 can be appropriately tilted to the left or right based on the direction in which the axial load is applied thereto.

The pivots 300 are fixed on the inner surface of the housing body 100 and inserted into the respective concave sockets 210 of the tilting pads 200. Each pivot 300 has a curved surface having a predetermined curvature such that it can be inserted into the corresponding socket 210. The pivot 300 may have a hemispherical shape. In this regard, the radius of curvature of each pivot 300 is less than the radius of curvature of the corresponding socket 210 so that the associated titling pad 200 can slide on the outer surface of the pivot 300 according to the direction of the axial load and vary in a contact point therebetween to allow the tilting pad 200 to be appropriately tilted.

An oil collection unit for collecting oil is formed in the outer circumferential surface of each pivot 300. In the first embodiment of the present invention, the oil collection unit may include a plurality of grooves 320 which are annularly formed around the outer circumferential surface of the pivot 300 at positions spaced apart from each other. In the first embodiment, the grooves 320 are formed in the form of circles that are increased in diameter from the peak point of the pivot 300 at which the pivot 300 makes contact with the tilting pad 200 to the bottom of the pivot 300. The grooves 320 may be formed parallel with each other in a direction perpendicular to a center axis of the pivot 300 that extends from the peak point at which the pivot 300 makes contact with the tilting pad 200 toward the center of the pivot 300. However, the present invention is not limited to this structure. For example, the grooves 320 which are spaced apart from each other may be formed parallel with each other in a direction parallel to the center axis of the pivot 300 or a direction inclined from the center axis at a predetermined angle.

Preferably, each groove 320 is not thick, so that the tilting movement of the titling pad 200 by sliding of the socket 210 of the tilting pad 200 on the outer circumferential surface of the pivot 300 can be prevented from being impeded by the grooves 320. Furthermore, preferably, there is no groove on the peak point of the pivot 300.

Therefore, lubricant such as oil that is supplied into the space between the inner surface of the housing body 100 and the tilting pads 200 spaced apart therefrom by a predetermined distance is drawn into and collected in the oil collection unit formed in the outer circumferential surface of the pivot 300, in other words, in the grooves 320 that are annularly formed around the outer circumferential surface of the pivot 300. A sufficient amount of lubricant can be retained between the sockets 210 of the titling pads 200 and the pivots 300, thus reducing friction between the tilting pads 200 and the outer surfaces of the pivots 300.

Hereinbelow, the configuration of the ball-socket type tilting pad journal bearing according to the second embodiment of the present invention will be described with reference to FIG. 5.

The configuration of the ball-socket type tilting pad journal bearing according to the second embodiment of the present invention schematically includes a housing body 100, tilting pads 200, and pivots 300. The housing body 100, the tilting pads 200, and the pivots 300 according to the second embodiment are the same as those of the tilting pad journal bearing according to the first embodiment, and descriptions thereof will be omitted because they are the same as those of the first embodiment. The description of the second embodiment will be focused on an oil collection unit that is formed on the outer circumferential surface of each pivot 300 and differs from that of the first embodiment.

The oil collection unit for collecting oil is formed in the outer circumferential surface of each pivot 300. In the second embodiment of the present invention, the oil collection unit may include a groove 1320 which is spirally formed around the outer circumferential surface of the pivot 300.

Preferably, the groove 1320 is not thick, so that the tilting movement of the titling pad 200 by sliding of the socket 210 of the tilting pad 200 on the outer circumferential surface of the pivot 300 can be prevented from being impeded by the grooves 1320. Furthermore, preferably, there is no groove on the peak point of the pivot 300.

Therefore, lubricant such as oil that is supplied into the space between the inner surface of the housing body 100 and the tilting pads 200 spaced apart therefrom by a predetermined distance is drawn into and collected in the oil collection unit formed in the outer circumferential surface of the pivot 300, in other words, in the groove 1320 that is spirally formed around the outer circumferential surface of the pivot 300. A sufficient amount of lubricant can be retained between the sockets 210 of the titling pads 200 and the pivots 300, thus reducing friction between the tilting pads 200 and the outer surfaces of the pivots 300.

Hereinbelow, the configuration of the ball-socket type tilting pad journal bearing according to the third embodiment of the present invention will be described with reference to FIG. 6.

The configuration of the ball-socket type tilting pad journal bearing according to the third embodiment of the present invention schematically includes a housing body 100, tilting pads 200, and pivots 300. The housing body 100, the tilting pads 200, and the pivots 300 according to the third embodiment are the same as those of the tilting pad journal bearing according to the first embodiment, and descriptions thereof will be omitted because they are the same as those of the first embodiment. The description of the third embodiment will be focused on an oil collection unit that is formed on the outer circumferential surface of each pivot 300 and differs from that of the first embodiment.

The oil collection unit for collecting oil is formed in the outer circumferential surface of each pivot 300. In the third embodiment of the present invention, the oil collection unit includes a plurality of point-shaped dimples 2320. Each dimple 2320 is a circular depression having a point shape, and the plurality of dimples 2320 may be arranged around the outer circumferential surface of the pivot 300. In detail, as shown in the third embodiment, the dimples 2320 may be arranged in a plurality of rows around the outer circumferential surface of the pivot 300. However, the present invention is not limited to this, and each of the dimples 2320 may have any shape, for example, a circular shape, a quadrangular shape, etc.

Preferably, an appropriate number of dimples 2320 are formed in appropriate number of rows, so that the tilting movement of the titling pad 200 by sliding of the socket 210 of the tilting pad 200 on the outer circumferential surface of the pivot 300 can be prevented from being impeded by the dimples 320. Furthermore, preferably, there is no dimple on the peak point of the pivot 300.

Therefore, lubricant such as oil that is supplied into the space between the inner surface of the housing body 100 and the tilting pads 200 spaced apart therefrom by a predetermined distance is drawn into and collected in the oil collection unit formed in the outer circumferential surface of the pivot 300, in other words, in the point-shaped dimples 2320 that are formed around the outer circumferential surface of the pivot 300. A sufficient amount of lubricant can be retained between the sockets 210 of the titling pads 200 and the pivots 300, thus reducing friction between the tilting pads 200 and the outer surfaces of the pivots 300.

Hereinbelow, the configuration of the ball-socket type tilting pad journal bearing according to the fourth embodiment of the present invention will be described with reference to FIG. 7.

The configuration of the ball-socket type tilting pad journal bearing according to the fourth embodiment of the present invention schematically includes a housing body 100, a tilting pad 200, and a pivot 300. The housing body 100, the tilting pads 200, and the pivots 300 according to the fourth embodiment are the same as those of the tilting pad journal bearing according to the first embodiment, and descriptions thereof will be omitted because they are the same as those of the first embodiment. The description of the fourth embodiment will be focused on an oil collection unit that is formed on the outer circumferential surface of each pivot 300 and differs from that of the first embodiment.

The oil collection unit for collecting oil is formed in the outer circumferential surface of each pivot 300. In the fourth embodiment of the present invention, the oil collection unit includes a plurality of ring-shaped dimples 3320. In the fourth embodiment, each dimple 3320 has a circular ring shape. However, the shape of the dimple 3320 is not limited to the circular ring shape, and the dimple 3320 may have any type of ring shape, for example, a square ring shape, etc. The plurality of dimples 3320 may be arranged around the outer circumferential surface of the pivot 300. In detail, as shown in the fourth embodiment, the dimples 3320 may be arranged in a plurality of rows around the outer circumferential surface of the pivot 300.

Preferably, an appropriate number of dimples 3320 are formed in appropriate number of rows, so that the tilting movement of the titling pad 200 by sliding of the socket 210 of the tilting pad 200 on the outer circumferential surface of the pivot 300 can be prevented from being impeded by the dimples 3320. Furthermore, preferably, there is no dimple on the peak point of the pivot 300.

Therefore, lubricant such as oil that is supplied into space between the inner surface of the housing body 100 and the tilting pads 200 spaced apart therefrom by a predetermined distance is drawn into and collected in the oil collection unit formed in the outer circumferential surface of the pivot 300, in other words, in the ring-shaped dimples 3320 that are formed around the outer circumferential surface of the pivot 300. A sufficient amount of lubricant can be retained between the sockets 210 of the titling pads 200 and the pivots 300, thus reducing friction between the tilting pads 200 and the outer surfaces of the pivots 300.

As described above, because friction is reduced between the plurality of tilting pads 200 and the plurality of pivots 300, it is possible to reduce abrasion and power loss attributable to friction.

The present invention is not limited to the above-described embodiments. For instance, although in each embodiment the oil collection units have been illustrated as being formed on the outer circumferential surface of each pivot, the oil collection unit may be formed in the socket 210 of each tilting pad 200 such that oil is collected between the tilting pads 200 and the pivots 300 so as to reduce friction between the tilting pads 200 and the outer circumferential surfaces of the pivots 300. Alternatively, the oil collection unit may be formed in both the outer circumferential surfaces of the pivots and the sockets of the tilting pads.

Although not shown, the oil collection unit formed in the socket 210 of each tilting pad 200 may have the same shape as that of the oil collection unit formed on the outer circumferential surface of each pivot 300.

In a ball-socket type tilting pad journal bearing according to the present invention, an oil collection unit for collecting oil is formed on an outer circumferential surface of a pivot or in a socket of a tilting pad, thus reducing friction between the tilting pad and the pivot.

Consequently, it is possible to reduce abrasion and power loss attributable to friction between the tilting pad and the pivot.

While the present invention has been described with respect to the specific embodiments, it will be apparent to those skilled in the art that various changes and modifications may be made without departing from the spirit and scope of the invention as defined in the following claims.

What is claimed is:

1. A ball-socket type tilting pad journal bearing comprising:
   a cylindrical housing body;
   a plurality of tilting pads disposed inside the housing body and arranged along a circumference of the housing body, with a concave socket formed in a side surface of each of the tilting pads that faces an inner surface of the housing body; and
   a plurality of pivots fixed on the inner surface of the housing body and inserted into the respective sockets of the tilting pads, each of the pivots having a curved surface;
   wherein an oil collection unit for collecting oil is provided in an outer circumferential surface of each of the pivots, and
   wherein the oil collection unit comprises a plurality of circular grooves formed in a circumferential direction of each of the pivots and spaced apart from each other or a spiral groove formed in a circumferential direction of each of the pivots.

2. The ball-socket type tilting pad journal bearing according to claim 1, further comprising:
   a fixed housing coupled to a predetermined portion of the housing body, wherein support pins protruding from upper and lower surfaces of each of the tilting pads in an axial direction of the tilting pad are respectively inserted into and fixed in a depression formed in the housing body and a depression formed in the fixed housing.

3. The ball-socket type tilting pad journal bearing according to claim 1, wherein each of the pivots has a hemispherical shape.

4. The ball-socket type tilting pad journal bearing according to claim 1, wherein the circular grooves spaced apart from each other are formed parallel with each other in a direction perpendicular to a center axis of the pivot.

5. The ball-socket type tilting pad journal bearing according to claim 1, wherein the tilting pads are installed to be spaced apart from the inner surface of the housing body and an outer surface of a center shaft disposed in a central portion of the housing body, respectively.

6. The ball-socket type tilting pad journal bearing according to claim 1, wherein the oil collection unit is spaced apart from a peak point of the outer circumferential surface of each of the pivots.

7. The ball-socket type tilting pad journal bearing according to claim 1, wherein a radius of curvature of each of the pivots is less than a radius of curvature of each of the sockets.

8. A ball-socket type tilting pad journal bearing comprising:
   a cylindrical housing body;
   a plurality of tilting pads disposed inside the housing body and arranged along a circumference of the housing body, with a concave socket formed in a side surface of each of the tilting pads that faces an inner surface of the housing body; and
   a plurality of pivots fixed on the inner surface of the housing body and inserted into the respective sockets of the tilting pads, each of the pivots having a curved surface;
   wherein an oil collection unit for collecting oil is provided in the socket of each of the tilting pads, and
   wherein the oil collection unit comprises a plurality of circular grooves formed in a circumferential direction of each of the sockets and spaced apart from each other or a spiral groove formed in a circumferential direction of each of the sockets.

9. The ball-socket type tilting pad journal bearing according to claim 8, further comprising:
   a fixed housing coupled to a predetermined portion of the housing body,
   wherein support pins protruding from upper and lower surfaces of each of the tilting pads in an axial direction of the tilting pad are respectively inserted into and fixed in a depression formed in the housing body and a depression formed in the fixed housing.

10. The ball-socket type tilting pad journal bearing according to claim 8, wherein each of the pivots has a hemispherical shape.

11. The ball-socket type tilting pad journal bearing according to claim 8, wherein the circular grooves spaced apart from each other are formed parallel with each other in a direction perpendicular to a center axis of the pivot.

12. The ball-socket type tilting pad journal bearing according to claim 8, wherein the tilting pads are installed to be spaced apart from the inner surface of the housing body and an outer surface of a center shaft disposed in a central portion of the housing body, respectively.

13. The ball-socket type tilting pad journal bearing according to claim 8, wherein the oil collection unit is spaced apart from a peak point of the outer circumferential surface of each of the pivots.

14. The ball-socket type tilting pad journal bearing according to claim 8, wherein a radius of curvature of each of the pivots is less than a radius of curvature of each of the sockets.

15. A ball-socket type tilting pad journal bearing comprising:
   a cylindrical housing body;
   a plurality of tilting pads disposed inside the housing body and arranged along a circumference of the housing body, with a concave socket formed in a side surface of each of the tilting pads that faces an inner surface of the housing body; and
   a plurality of pivots fixed on the inner surface of the housing body and inserted into the respective sockets of the tilting pads, each of the pivots having a curved surface;
   wherein an oil collection unit for collecting oil is provided in both an outer circumferential surface of each of the pivots and the socket of each of the tilting pads, and
   wherein the oil collection unit comprises a plurality of circular grooves formed in a circumferential direction of each of the pivots and the sockets and spaced apart from each other or a spiral groove formed in a circumferential direction of each of the pivots and the sockets.

16. The ball-socket type tilting pad journal bearing according to claim 15, further comprising:
   a fixed housing coupled to a predetermined portion of the housing body,
   wherein support pins protruding from upper and lower surfaces of each of the tilting pads in an axial direction of the tilting pad are respectively inserted into and fixed in a depression formed in the housing body and a depression formed in the fixed housing.

17. The ball-socket type tilting pad journal bearing according to claim 15, wherein each of the pivots has a hemispherical shape.

18. The ball-socket type tilting pad journal bearing according to claim 15, wherein the circular grooves spaced apart from each other are formed parallel with each other in a direction perpendicular to a center axis of the pivot.

19. The ball-socket type tilting pad journal bearing according to claim 15, wherein the tilting pads are installed to be spaced apart from the inner surface of the housing body and an outer surface of a center shaft disposed in a central portion of the housing body, respectively.

20. The ball-socket type tilting pad journal bearing according to claim 15, wherein the oil collection unit is spaced apart from a peak mint of the outer circumferential surface of each of the pivots.

* * * * *